Aug. 21, 1923.
Re. 15,681
W. R. PORTER
DENTAL ENGINE HANDPIECE
Original Filed Nov. 12, 1920
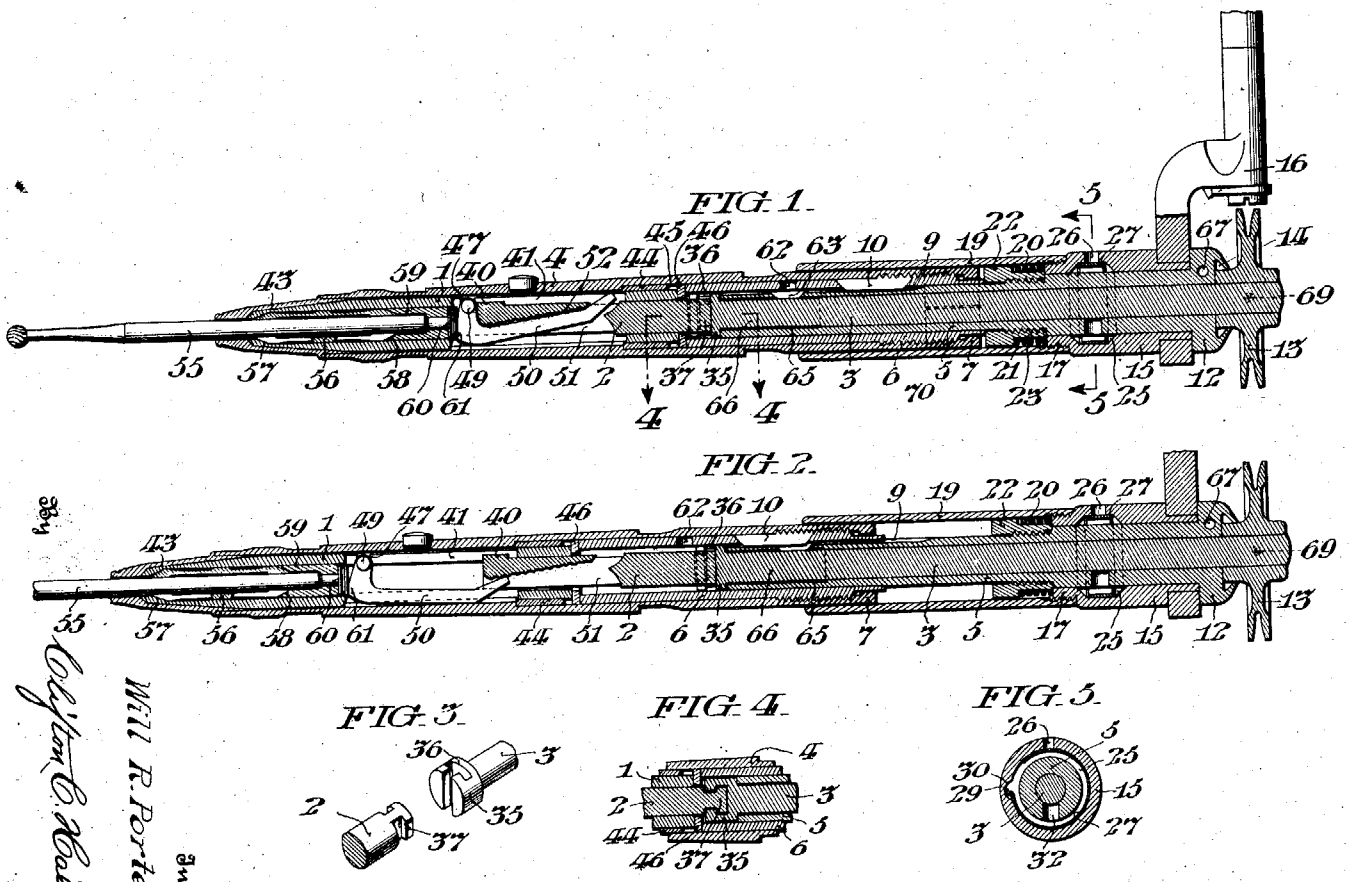
Inventor
Will R. Porter,
By Clifton C. Halloweel,
Attorney Reissued Aug. 21, 1923. Re. 15,681

UNITED STATES PATENT OFFICE.

WILL R. PORTER, OF ELMHURST, NEW YORK, ASSIGNOR TO THE S. S. WHITE DENTAL MANUFACTURING COMPANY, A CORPORATION OF PENNSYLVANIA.

DENTAL-ENGINE HANDPIECE.

Original No. 1,408,907, dated March 7, 1922, Serial No. 423,650, filed November 12, 1920. Application for reissue filed March 3, 1923. Serial No. 622,643.

*To all whom it may concern:*

Be it known that I, WILL R. PORTER, a citizen of the United States, and a resident of Elmhurst, in the county of Queens, State of New York, have invented certain new and useful Improvements in Dental-Engine Handpieces, of which the following is a specification, reference being had to the accompanying drawings.

My invention relates particularly to that class of handpieces in which the tool-actuating parts are belt-driven, and which are commonly known as "all-cord" handpieces.

Handpieces of the all-cord type as heretofore constructed were provided with a tool-engaging chuck which was actuated to clamp the tool by means of a threaded shank arranged to be actuated by a thumb-nut whereby it was advanced or retracted with respect to said chuck to clamp or unclamp the tool as desired.

The principal object of my invention is to provide an "all-cord" or "belt-driven" handpiece with chuck operating mechanism actuated to clamp a tool by a relative axial sliding movement of certain of the handpiece parts.

Other objects of my invention are to provide a handpiece of the type contemplated with means to prevent the sheath from rotating with the rotary spindles but permitting it to freely oscillate with the natural working movements of the hand of the operator.

My invention further comprehends novel means for permitting the ready injection of lubricating oil and retaining it in and about the spindle bearing.

Specifically stated, the form of my invention as hereinafter described, comprehends an "all-cord" or "belt-driven" handpiece comprising a clutch actuated to clamp a tool by means of a pivoted lever cooperative with the inclined surface of a wedge, and slidably movable with respect thereto; a belt-driven spindle for rotating said clutch, having a bearing mounted in a support and capable of oscillation therein, but prevented from rotation with said spindle, by a coiled spring interposed between said bearing and its support, said support being provided with an oil chamber whose inlet is normally closed by a spring plate yieldingly engaging the inner wall of said chamber.

My invention also includes all of the various novel features of construction and arrangement as hereinafter more definitely specified.

In the accompanying drawings, Figure 1 is a central longitudinal sectional view of a handpiece constructed in accordance with my invention; Fig. 2 is a similar longitudinal sectional view of said handpiece having its relatively movable clamp-actuating parts axially extended to clamp the chuck on the tool; Fig. 3 is a fragmentary perspective view of the universal connection between the driving shaft and wedge slide or coupling; Fig. 4 is a fragmentary sectional view taken axially of said handpiece on the line 4—4 in Fig. 1; and Fig. 5 is a transverse sectional view taken through the oil chamber on the line 5—5 in Fig. 1.

In said figures, the handpiece comprises the forward tubular spindle 1 engaged by the wedge slide or coupling 2 with the back spindle or driving shaft 3, and arranged to be rotated thereby within the casing comprising the tubular sheath or hand-hold 4 which is slidably mounted on the back spindle bearing or slide 5 by its threaded connection with the sleeve or collet 6 which is mounted to slide longitudinally on said bearing or slide 5.

The sleeve or collet 6 is in threaded engagement with the rear end of the sheath 4, and therefore, may be adjusted axially therein and retained in such adjusted position by the sheath adjusting lock nut 7 which is also in threaded engagement with said sleeve or collet 6.

The driving shaft bearing or slide 5 is conveniently provided with the keyway 9 into which the collet key 10 in the collet 6 may extend to prevent the relative rotation of said collet 6 and slide 5, but permitting their free relative movement in an axial or longitudinal direction.

The slide or bearing 5 has its rear end enlarged to provide a boss 12 against which the spindle pulley 13 on the back spindle or driving shaft 3 rotates, and said boss is flanged to provide an annular space 14 arranged to catch any drippings of oil which may ooze out between the back spindle or driving shaft 3 and its bearing 5. The bearing or slide 5 is arranged to be rotatably supported in the wrist joint frame extension 15 which is carried by the wrist joint frame 16 of well known construction.

The forward end of the wrist joint frame extension is provided with the threaded boss 17 which conveniently carries the tubular shield 19 extended forwardly and disposed in telescopic relation with the sheath or hand-hold 4, and serving as a protection to the exposed oily exterior surface of the slide 5 when the sheath 4 is extended with respect to said slide 5 as shown in Fig. 2 to clamp the tool as hereinafter described.

The bearing or slide 5 is prevented from rotating with the back spindle or driving shaft 3 by the coiled spring 20 which is interposed between the forward end of the wrist joint frame extension and the shoulder 21 formed by the head 22 of the nut 23, which is in threaded engagement with the bearing 5 and arranged to hold the spring 20 under compression to provide sufficient friction to prevent the slide 5 and the sheath 4 carried thereby from rotating with the rotary spindle or driving shaft 3, but permitting them to freely oscillate with the natural working movements of the hand of the operator.

The wrist joint frame extension is provided with the annular oil chamber 25 surrounding the slide or bearing 5 and has the oil inlet aperture 26 which is normally closed by the oil retaining shutter 27 comprising the sheet metal spring which is curved to conform to and closely engage the inner wall of said chamber 25 and has one end 29 bent laterally to engage a suitable recess or notch 30 in the inner wall of said chamber 25, as best shown in Fig. 5. The slide or bearing 5 is provided with the oil aperture 32 opening into the oil chamber 25 and arranged to admit oil between the back spindle or driving shaft 3 and its bearing.

The forward end of the back spindle or driving shaft 3 is enlarged to form the cylindrical head 35 and is provided with the undercut transversely extending slot 36, which is arranged to receive the T-headed projection 37 of the wedge slide or coupling 2 fitted therein with sufficient looseness to afford a substantially universal joint whereby the rotation of the back spindle or driving shaft 3 effects the rotation of said wedge slide or coupling 2.

Said wedge slide 2 is provided at its forward end with the projecting key or spline 40 extending into a suitable slot or keyway 41 in the wall of the forward spindle 1 which is mounted for rotation in the sheath 4. The forward end of said forward spindle 1 is supported in the conical bearing 43, and the back end is arranged to rotate in the bearing provided by the cylindrical sheath bushing 44, mounted in the recess 45 in the wall of the bore of said sheath 4. An end thrust bearing washer 46 is disposed in the bore of the sheath 4 and affords an end thrust bearing for the forward spindle 1.

The forward spindle 1 is provided with the transversely disposed slot 47 intersecting the slot 41 and serving as a bearing for the trunnions 49 of the lever 50, which is disposed for oscillation in the slot 51 in the wedge slide or coupling 2, and which has its free end inclined to bear against the serrated wall 52 of said slot, so that said free end may engage any one of the serrations and serve to lock the parts of the handpiece in their relatively adjusted positions when extended, as shown in Fig. 2.

The lever 50 is arranged to effect the clamping of the tool 55 in the chuck 56, which is longitudinally split and provided at its opposite ends with conical surfaces respectively arranged to bear against similarly inclined conical surfaces 57 and 58, respectively formed in the bore of the forward spindle 1, and in the bore of the plunger 59, which carries the plunger tip 60 arranged to be engaged by the elbow 61 of the lever 50, so that when the relatively slidable members of the handpiece are shifted to cause the lever 50 to ride upon the serrated wall 52, the elbow 61 forces the plunger 59 forwardly against the chuck 56 and by cooperation of the conical ends of said chuck with the conical surfaces 57 and 58, it is contracted to embrace the tool 55 therein with such pressure as to firmly hold said tool in its operative position.

The collet 6 is provided with the oil hole 62 which registers with a suitable opening 63 in the slide 5 for the injection of oil into the annular chamber 65 between the driving shaft 3 and its bearing in the slide 5, formed by the reduced region 66 of said driving shaft 3. Said oil hole 62 is normally covered by the sheath 4 and is accessible by the mere removal of said sheath.

The boss 12 of the slide 5 is conveniently provided with the aperture 67 into which a bodkin or other suitable tool may be inserted for holding said boss when it is desired to remove or separate the handpiece parts by relative rotation.

It will be readily seen that the slightest wear of the parts in their bearings may be taken up by loosening the sheath-adjusting nut 7 and rotating the sheath 4 on the collet 6 until the adjustment of the bearings is attained, which adjustment may be maintained by jamming the sheath-adjusting nut 7 into engagement with the end of the sheath 4. Said sheath nut 7 may preferably be split as shown at 70 and by its spring pressure tightly clamps the collet 6.

My invention is advantageous in that the parts of the handpiece may be taken apart and assembled by the removal of a single set screw 69 and the sheath 4, which permits the withdrawal of the back spindle or driving shaft 3 from its bearing in the slide 5, and when thus released from said bearing, the wedge slide 2 may be separated from said back spindle or driving shaft 3 by simply sliding them oppositely in a lateral direction to release the T-head 37 on said wedge-slide 2, from the under cut slot 36 in the head 35 of the back spindle or driving shaft 3.

Furthermore, by the construction herein contemplated, the space between the relatively slidable members is bridged by the shield 19, so as to protect the oily exterior surface of the slide 5, and thereby prevent the hands of the operator from being soiled by contact therewith.

It is to be understood that the terms "all-cord" and "belt-driven" in the specification and claims are to be considered synonymous and refer specifically to a well-known construction of handpiece wherein the back spindle or driving-shaft thereof is provided with a cord pulley which is directly mounted thereon, and secured thereto, and which forms an integral part.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A belt-driven dental engine handpiece having a tool-engaging clutch actuated to grip and release a tool by a lever movable longitudinally on an inclined surface.

2. A belt-driven dental engine handpiece having relatively movable tool clamping means arranged to be actuated to clamp and release a tool by relatively sliding said means longitudinally by a forward and backward movement of the hand of the operator.

3. A belt-driven dental engine handpiece having a sheath, a tool-engaging clutch rotatably mounted in said sheath, a supporting frame, and yielding means tending to prevent the rotation of said sheath with said clutch, but permitting its relative rotary movement with respect to said frame.

4. A belt-driven dental engine handpiece comprising a driving shaft, tool-holding means connected to be rotated by said driving shaft, a bearing for said driving shaft, a support for said bearing, and a spring interposed between said support and bearing tending to frictionally prevent the rotation of said bearing with said shaft but permitting the relative rotary movement of said bearing and support.

5. A belt-driven dental engine handpiece comprising a driving shaft, a tool-holding means connected to be rotated by said driving shaft, a bearing for said driving shaft, a support for said bearing having an annular oil chamber embracing said bearing, and having an inlet extended through the wall of said support, and a shutter for said inlet comprising a sheet spring tending to engage the wall of said chamber and normally close said inlet.

6. A belt-driven dental engine handpiece comprising a driving shaft, tool-holding means connected to be rotated by said driving shaft, a bearing for said driving shaft having an oil hole therein, a support for said bearing provided with an annular oil chamber embracing said bearing and having an inlet extended through the wall of said support, and a yielding shutter for said inlet substantially conforming to the wall of said chamber and tending to close said inlet.

7. A belt-driven dental engine handpiece comprising a driving shaft, tool-holding means connected to be rotated by said driving shaft, a bearing for said driving shaft having an oil hole extended therethrough, a support for said bearing comprising an annular oil chamber disposed in communication with said oil hole, and having a recess or notch therein and an inlet extending through the wall thereof, and a shutter for said inlet comprising a sheet spring substantially conforming to the wall of said chamber tending to close said inlet and having one end thereof extended into said notch or recess to prevent its accidental displacement.

8. In a dental engine handpiece, the combination with a driving shaft having a belt or cord pulley thereon by which it may be rotated, of a bearing for said driving shaft providing a slide, a sheath supported by said slide, and arranged to be shifted axially thereon, a tool-holding clutch rotatably mounted in said sheath and connected to be rotated by said driving shaft, and means comprising a lever actuated by the longitudinal movement of said sheath on said bearing to effect the clamping or the releasing of said tool.

9. In a dental engine handpiece, the combination with a driving shaft having a cord pulley thereon by which it is rotated, of a bearing for said driving shaft providing a slide, a sheath supported by said slide and arranged to move axially with respect thereto, a tool-holding clutch rotatably mounted in said sheath, and a connection comprising a substantially universal joint between said clutch and driving shaft whereby said clutch is rotated, and means actuated by the relative longitudinal movement of said sheath and said slide to effect the opening and closing of said chuck.

10. In a dental engine handpiece, the combination with a driving shaft having a cord pulley thereon by which it is rotated, of a bearing for said driving shaft providing a slide, a support for said bearing, a spring interposed between said bearing and its support tending to prevent the rotation of said bearing with said shaft but permitting its relative rotatable movement with respect to said support, a collet longitudinally movable on said slide, a sheath carried by said collet, a hollow spindle rotatably mounted in said sheath, means comprising a universal joint connecting said hollow spindle with said driving shaft, a tool-engaging clutch carried by said spindle, and means effected by longitudinal movement of said collet on said slide to clamp or release a tool in said chuck.

11. In a dental engine handpiece, the combination with a driving shaft having a cord pulley thereon by which it is rotated, of a bearing for said driving shaft providing a slide, a support for said bearing, a spring interposed between said bearing and its support tending to prevent the rotation of said bearing with said shaft but permitting its relative rotation with respect to said support, a collet longitudinally movable on said slide, a sheath carried by said collet, a hollow spindle rotatably mounted in said sheath, a wedge slide connecting said spindle with said driving shaft and comprising a universal joint, a tool chuck carried by said spindle, and a lever cooperative with said wedge slide arranged to actuate said clutch to grip and release a tool by the longitudinal movement of said collet on said slide.

12. In a dental engine handpiece, the combination with a driving shaft having a cord pulley thereon by which it is rotated, of a bearing for said driving shaft providing a slide, a support for said bearing, a spring interposed between said bearing and its support, tending to prevent the rotation of said bearing with said shaft but permitting its relative rotation with respect to said support, a collet longitudinally movable on said slide, a sheath carried by said collet, a hollow spindle rotatably mounted in said sheath, a wedge slide connecting said spindle with said driving shaft and comprising a universal joint, a tool chuck carried by said spindle, and a lever cooperative with said wedge slide arranged to actuate said clutch to grip and release a tool by the longitudinal movement of said collet on said slide, and a shield carried by said support arranged to protect the surface of said slide when said collet and said slide are relatively extended.

13. In a dental engine handpiece the combination with a driving shaft, of a bearing for said driving shaft, means carrying an operative tool actuated by said driving shaft, a support in which said bearing is rotatably mounted, a nut in threaded engagement with said bearing adjustable toward and from said support, and a spring interposed between said nut and said support tending to prevent said bearing from rotating with said shaft but permitting its rotary movement with respect to said support.

In witness whereof, I have hereunto set my hand this 20th day of February, A. D., 1923.

WILL R. PORTER.

Witnesses:
CLIFTON C. HALLOWELL,
WILLIAM J. RUSSELL.